United States Patent
Wobbe et al.

(10) Patent No.: US 6,558,603 B2
(45) Date of Patent: May 6, 2003

(54) METHOD OF AND APPARATUS FOR PRODUCING INJECTION MOLDED PARTS REINFORCED WITH LONG FIBERS

(75) Inventors: Hans Wobbe, Herrsching (DE); Bernd Klotz, Günding/Bergkirchen (DE); Jochen Zwiesele, München (DE)

(73) Assignee: Krauss-Maffei Kunststofftechnik GmbH, München (DE)

( * ) Notice: Subject to any disclaimer, the term of this patent is extended or adjusted under 35 U.S.C. 154(b) by 131 days.

(21) Appl. No.: 09/876,418

(22) Filed: Jun. 5, 2001

(65) Prior Publication Data

US 2001/0048170 A1 Dec. 6, 2001

Related U.S. Application Data

(63) Continuation of application No. PCT/EP99/10284, filed on Dec. 22, 1999.

(51) Int. Cl.[7] .............................................. B29C 45/53
(52) U.S. Cl. ................. 264/297.2; 264/328.8; 425/561; 425/572; 425/588
(58) Field of Search .................... 264/40.1, 297.2, 264/328.8; 425/561, 572, 573, 588, 559

(56) References Cited

U.S. PATENT DOCUMENTS

| | | | | |
|---|---|---|---|---|
| 3,049,757 A | * | 8/1962 | Hagerborg | 425/586 |
| 3,417,433 A | * | 12/1968 | Teraoka | 425/559 |
| 3,861,841 A | * | 1/1975 | Hanning | 425/146 |
| 4,734,243 A | * | 3/1988 | Kohama et al. | 264/328.8 |
| 5,043,129 A | * | 8/1991 | Sorensen | 264/297.2 |
| 5,358,680 A | | 10/1994 | Boissonnat et al. | |
| 5,454,995 A | | 10/1995 | Rusconi et al. | |
| 5,814,358 A | * | 9/1998 | Bock | 425/557 |

FOREIGN PATENT DOCUMENTS

| | | |
|---|---|---|
| DE | 195 23 490 A | 6/1995 |
| DE | 195 38 255 A | 10/1995 |
| DE | 195 17 009 A | 11/1996 |
| EP | 0 743 160 A | 11/1996 |
| EP | 0 835 734 A | 4/1998 |
| FR | 2 549 770 A | 2/1985 |
| JP | 07 108575 A | 4/1995 |
| WO | WO 86 06321 A | 11/1986 |

OTHER PUBLICATIONS

"In–line compounding system cuts molding costs, lifts quality" Modern Plastics, International, CH, McGraw–Hill, Inc. Lausanne Oct. 1, 1993.

* cited by examiner

Primary Examiner—Jill L. Heitbrink
(74) Attorney, Agent, or Firm—Henry M. Feiereisen

(57) ABSTRACT

Apparatus for producing thermoplastic injection-molded parts reinforced with long fibers, includes a compounder having two meshing screws rotating in a same direction for continuously generating a stream of melt of thermoplastic material reinforced with long fibers. Melt is alternatingly conducted to at least two piston and cylinder units for injection into at least one cavity of an injection mold at a suitable pressure. Each of the piston and cylinder units includes a cylinder and a differential piston movably received in the cylinder and dividing the cylinder into a feed chamber and an injection chamber, wherein the piston has a relatively greater piston surface, adjacent the injection chamber, and a relatively smaller piston surface, adjacent the feed chamber. The differential piston has a passageway for interconnecting the greater piston surface and the smaller piston surface to permit a flow of melt from the feed chamber into the injection chamber, whereby a flow of melt from the injection chamber back to the feed chamber is inhibited by a non-return valve disposed in the passageway of the differential piston.

3 Claims, 3 Drawing Sheets

METHOD OF AND APPARATUS FOR PRODUCING INJECTION MOLDED PARTS REINFORCED WITH LONG FIBERS

CROSS-REFERENCES TO RELATED APPLICATIONS

This application is a continuation of prior filed copending PCT International application no. PCT/EP99/10284, filed Dec. 22, 1999.

This application claims the priority of German Patent Application Ser. No. 198 59 472.0, filed Dec. 22, 1998, the subject matter of which is incorporated herein by reference.

BACKGROUND OF THE INVENTION

The present invention relates to a method of and apparatus for producing injection-molded parts reinforced with long fibers.

It is generally known to make structural parts, such as thermoplasts reinforced with glass mats (GMT), from long fiber reinforced thermoplastic material in such a way that semi-finished products in the form of glass mats impregnated with melt are heated and shaped by a subsequent compression process. During the compression process, the mold cavity will be completely filled by the flow of the semi-finished product. The structural part is removed from the open press after a cool-down period for subsequent transfer to a post-treatment station. This type of manufacturing process is rather complicated in view of the need for successive processing steps and the required treatment stations.

It is also known to make structural parts of fiber-reinforced thermoplastics by processing plastic granules with randomly oriented fibers in a conventional screw-plunger injection molding machine. This process permits introduction of fibers of a length of only 0.2 to 0.4 mm into the structural part, so that the strength of the structural part can be improved only to a limited extent.

It is further known to make structural parts from long fiber reinforced thermoplastic granules. The granules involved here are so-called long fiber pellets which are produced by impregnating parallel glass fiber strands with a thermoplastic melt during advance through an impregnator head. The strand issuing from the impregnator head is subsequently cut to a defined pellet length between 10 and 50 mm by a pelletizer. During processing of the long fiber pellets in a screw-plunger injection molding machine, the relatively long fibers are, however, exposed in the screw cylinder of the plastifying unit to substantial shearing stress so that the major part of the fairly long fibers is sheared off or breaks. The strength of the finished injection-molded product can thus be improved also only to a limited extent.

It is also known from the Handbook, VDI-Verlag, Fortschrittsberichte VDI, Dipl.-Ing. Frank Truckenmüller, "Direktverarbeitung von Endlosfasern auf Spritzgießmachinen" [*Direct Treatment of Continuous Fibers with Injection Molding Machines*], Series 3 Verfahrentechnik, No. 444, Apr. 1996, to introduce in a screw-plunger injection molding machine continuous fiber strands directly into the screw cylinder of the plastifying unit. Also in this case, the fiber strands are exposed during advance through the plastifying unit to substantial shearing stress so that the major fraction of the fibers is split in lengths that are too short.

German Pat. No. 195 23 490 discloses a two-shaft extruder with screw shafts running in same direction having a zone in which endless fibers are introduced into the screw cylinder at low pressure. Hereby, the endless fiber strands are thoroughly mixed with the melt in a continuous operation to a homogenous and gentle mixture which issues as mass strand at low pressure from the two-shaft extruder. This type of apparatus is known as compounder and effects an optimum mixture in a continuous operation. As the fiber-melt-mixture is produced continuously, this apparatus can be used for producing the long fiber granulate or long fiber pellets or for depositing the fiber-melt mixture on open mold halves via a slot die. After the fiber-melt mixture has been essentially applied on a surface of the mold half, both mold halves are pressed together and the structural part is completely shaped by a flowing process. While this process yields an optimum mixture of long fibers and melt, the further working steps of flat application of the fiber-melt-mixture upon a mold half and compressing are relatively time consuming operations to make thermoplastic parts reinforced with long fibers.

German Pat. No. DE 195 38 255 describes an extruder with two screws running in same direction for producing a continuous stream of a plastic melt which is laden with long reinforcement fibers and transferred by a subsequent injection unit, comprised of a cylinder and a piston, into the mold cavity of an injection mold at a pressure profile required for the molding process. In this apparatus, the continuous melt stream is initially conducted intermittently into an intermediate reservoir and from there into the cylinder space of the injection unit. Before entering the mold cavity, the melt stream laden with long reinforcement fibers is transported twice into the cylinder volume and out again. By reversing the flow direction twice, a great number of long fiber portions break.

FIG. 1 shows a schematic, partially sectional, illustration of a conventional arrangement for making injection-molded parts reinforced with long fibers, including a compounder 1 which has a housing 2 for accommodating two screws 3, 4 running in same direction and meshing with one another. The screws 3, 4 are operated continuously by a rotary drive 5 having a motor M. Arranged on the housing 2 is a feed hopper 6 for supply of thermoplastic granulate and a feed device 7 for introduction of a continuous long fiber strand 9 reeled off a roving 8. The long fiber strand 9 may, for example, be made of glass fiber. Basically any type of reinforcement is suitable, such as, e.g. carbon fibers, Kevlar fibers or natural fibers like hemp fibers.

The compounder 1 has an anterior screw chamber 10 which is fluidly connected via two branches 11, 12 to two pressure generating and discharge assemblies 13, 14, whereby a flow control valve 15 regulates the flow from the anterior screw chamber 10 in alternating sequence to the two pressure generating and discharge assemblies 13, 14. As shown in FIG. 1 by the partially sectional illustration of the lower one of the pressure generating and discharge assemblies 13, 14, each of the assemblies 13, 14 includes an injection plunger 16 and a hydraulic operating plunger 17 which is acted upon alternatingly via the hydraulic ports 18, 19 by a pressure fluid conveyed by a, not shown, pump for providing a predetermined pressure profile. Each of the pressure generating and discharge assemblies 13, 14 has an anterior cylinder space 20 which is fluidly connected via an injection nozzle 21 and a sprue channel 22 with a mold cavity 23 of an injection mold. The injection mold has a fixed mold mounting plate 26 for carrying a mold half 25, and a moving mold mounting plate for carrying a mold half 24, with guide rods 28 extending between the mounting plates 26, 27. The mold mounting plate 27 is moved to the opening and closing positions by a hydraulic unit 30, which is shown only partially.

At operation, the compounder 1 produces a continuous mass stream of thermoplastic melt which is permeated in a homogenous manner by a continuous fiber strand from the long fiber strand 9 drawn in via the feed device 7. The mass stream flows, controlled by the flow control valve 15, into the cylinder space 20 of the assembly 13. After the cylinder space 20 is completely filled with long fiber interspersed melt, the valve 15 is switched over to cut the connection between the anterior chamber 10 of the compounder 1 and the cylinder space 20 of the assembly 13 and to connect the anterior chamber 10 of the compounder 1 with the cylinder space 20 of the assembly 14. Subsequently, the injection plunger 16 is operated to inject the melt via the injection nozzle 21 and the sprue channel 22 into the cavity 23 between the closed mold halves 24, 25. The predetermined pressure profile in the cavity 23 for producing an injection-molded part 29 is adjusted trough appropriate admission of hydraulic pressure fluid to move the operating plunger 17.

It would be desirable and advantageous to provide an improved method and apparatus to obviate prior art shortcomings.

SUMMARY OF THE INVENTION

According to one aspect of the present invention, an apparatus for producing thermoplastic injection-molded parts reinforced with long fibers, includes a compounder having two meshing screws rotating in a same direction for continuously generating a stream of melt of thermoplastic material reinforced with long fibers; at least two piston and cylinder units alternatingly receiving melt from the compounder for injection into at least one cavity of an injection mold at a suitable pressure, wherein each said piston and cylinder unit includes a cylinder and a differential piston movably received in the cylinder and dividing the cylinder into a feed chamber and an injection chamber, wherein the piston has a greater piston surface, bounding the injection chamber, and a smaller piston surface, bounding the feed chamber, wherein the differential piston has a passageway for interconnecting the greater piston surface and the smaller piston surface to permit a flow of melt from the feed chamber into the injection chamber; and at least two non-return valves to inhibit a flow of melt from the injection chamber back to the feed chamber, with one non-return valve disposed in the passageway of the differential piston of one piston and cylinder unit, and the other non-return valve disposed in the passageway of the differential piston of the other piston and cylinder unit.

According to another aspect of the present invention, a method of producing thermoplastic injection-molded parts reinforced with long fibers, includes the steps of continuously feeding a stream of melt of thermoplastic material reinforced with long fibers to a feed space of at least two piston and cylinder units, each having a piston; and controlling a pressure upon the piston and cylinder units such that melt is able to flow from the feed space to an injection space in a cylinder of one piston and cylinder unit as a consequence of a differential pressure prevalent on opposite piston surfaces of the piston of the piston and cylinder unit to thereby fill the injection space, whereas melt in the injection space of the other piston and cylinder unit is forced into a cavity of an injection mold while prevented from returning to the feed space and while the feed space receives melt.

BRIEF DESCRIPTION OF THE DRAWING

Other features and advantages of the present invention will be more readily apparent upon reading the following description of a preferred exemplified embodiment of the invention with reference to the accompanying drawing, in which.

DETAILED DESCRIPTION OF PREFERRED EMBODIMENTS

Figure 1:
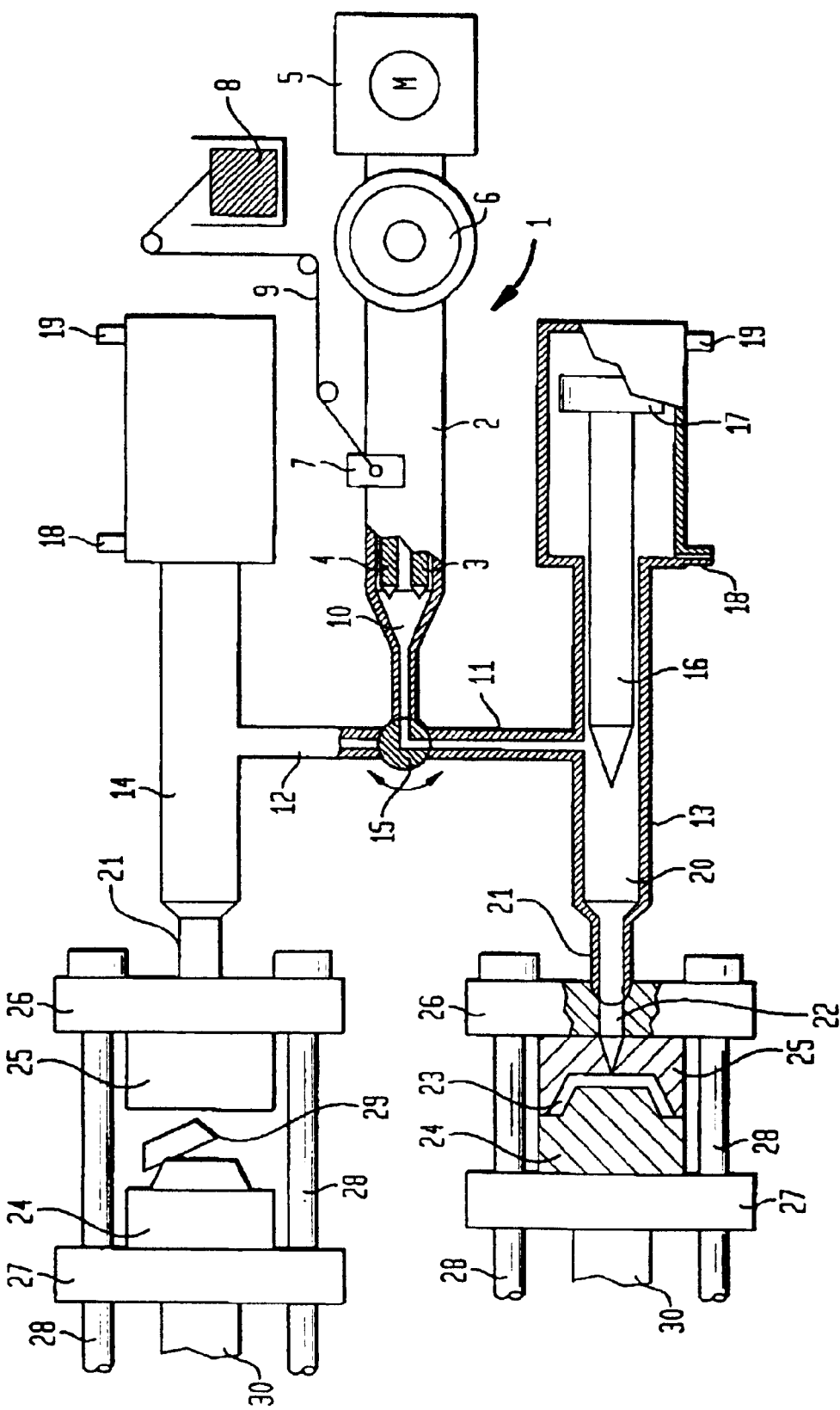
FIG. 1 is a schematic, partially sectional, illustration of a conventional arrangement of compounder with successive pressure generating and discharge assemblies and injection molding assemblies.

Throughout all the Figures, same or corresponding elements are generally indicated by same reference numerals.

Figure 2:
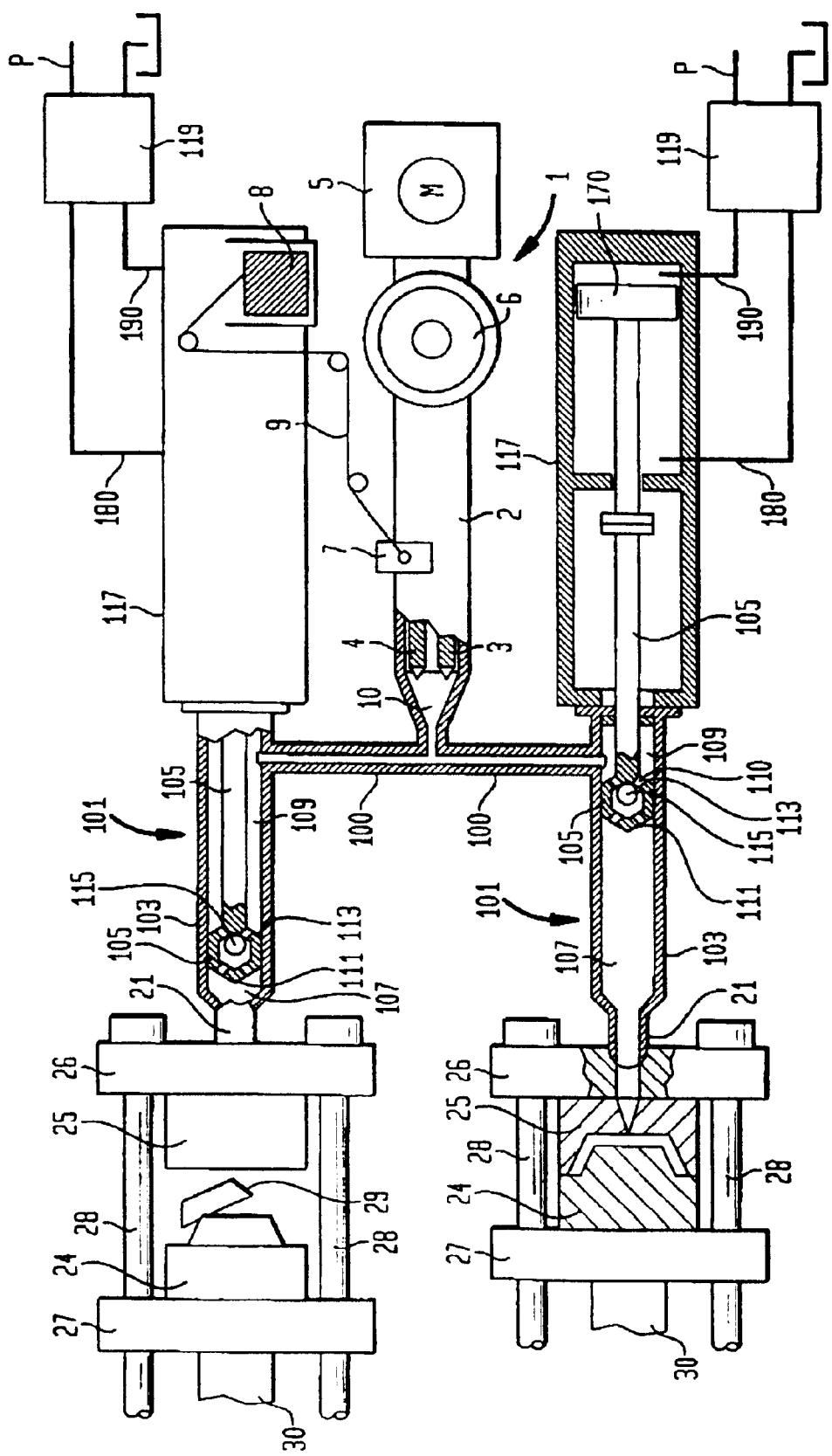
FIG. 2 is a schematic, partially sectional, illustration of one embodiment of an apparatus for making injection-molded parts reinforced with long fibers, in accordance with the present invention.

Turning now to FIG. 2, there is shown a schematic, partially sectional, illustration of one embodiment of an apparatus for making injection-molded parts reinforced with long fibers, in accordance with the present invention. Parts corresponding with those in FIG. 1 are denoted by identical reference numerals and not explained again. In this embodiment, the anterior screw chamber 10 of the compounder 1 is fluidly connected via two hot runners 100 to two injection assemblies 101. As the injection assemblies 101 are of an identical construction, it will be understood by persons skilled in the art that a description of one of the injection assemblies is equally applicable to the other injection assembly. Each injection assembly 101 includes an injection cylinder 103 for reciprocation of an injection plunger in the form of a differential plunger 105 which subdivides the injection cylinder 103 into an injection space 107, which extends to the injection nozzle 21 for direct injection of melt into the injection mold, and a feed space 109. The differential plunger 105 is defined by a greater piston surface 111 bounding the injection space 107, and a smaller, ring-shaped piston surface 113 bounding the feed space 109. Disposed in the differential piston is a non-return valve 115 for allowing a melt flow from the feed space 109 to the injection space 107 but inhibiting a melt flow in reverse direction. Actuation of the differential plunger 105 is implemented by a hydraulic piston and cylinder unit 117 which includes a hydraulic operating plunger 170 acted upon alternatingly via hydraulic ports 180, 190 by a pressure fluid conveyed by a, not shown, pump for providing a predetermined pressure profile. Operation of the piston and cylinder unit 117 is controlled by a control unit 119 to thereby instruct the differential plunger 105 to carry out the following operations:

Generation of dynamic pressure during filling of the injection unit 101 with melt, Generation of the injection pressure, and Generation of the after-pressure.

Furthermore, in order to carry out a flushing operation, the differential plunger 105 is moved to the rearmost position, to thereby reduce the feed space to a ring-shaped feed channel, as shown in FIG. 2 with respect to the lower one of the assemblies 101.

At operation, the compounder 1 produces continuously melt which is mixed with long fibers and conducted alternately via the hot runners 100, the feed space 109 and a passageway 110 in the differential pistons 105 into the injection space 107 of the injection assemblies 101. In the following description, the filling operation will be explained in more detail with reference to the lower one of the assemblies, shown in FIG. 2. In the position shown here, the control unit 119 is so operated that the differential plunger 105 is acted upon by a slight dynamic pressure which corresponds to the melt pressure as generated in the compounder 1.

As a consequence of the dynamic pressure, the adjusting differential pressure moves the differential plunger 105 in a controlled manner to the rear as the injection space is evenly filled with melt which is laden with long fibers and conveyed from the compounder 1 at a relatively low pressure level of, e.g. 120 bar. The melt flows hereby into the feed space 109 and via the passageway 110, controlled by the non-return valve 115, into the injection space 107. Due to the size difference between the greater piston surface 111 and the smaller ring-shaped piston surface 113, the differential piston 105 is moved backwards as the injection space 107 is filled, until the amount of melt in the injection space 107 is sufficient for the subsequent injection operation.

The following injection operation will be explained with reference to the upper one of the assemblies 101, shown in FIG. 2. In this operational stage, the control unit 119 instructs the hydraulic piston and cylinder unit 117 to act on the differential plunger 105 with a high push force. As the differential plunger 105 moves forward, the non-return valve 116 closes the passageway 110, so that the trapped melt amount in the injection space 107 is pressurized to a level in the range of 1500 to 2000 bar, that is required for the injection operation. Sealing of the melt volume under high injection pressure is hereby realized by the differential plunger 105. However, any leakage that may occur is inconsequential as the leakage amount merely flows into the feed space 109 and is returned to the injection space 107 during the next filling operation.

Following the injection stroke of the differential plunger 105 is the after-pressure phase in which an additional amount of melt is fed under injection pressure to make up for shrinkage of the melt amount in the cavity of the injection mold.

Unlike in the arrangement of FIG. 1, melt laden with long fibers flows in the apparatus according to the present invention from the anterior chamber 10 of the compounder 1 in a steady flow in only one direction toward the injection nozzle 21. The filling of the injection space 107 is implemented without reversal of the melt stream, as is encountered in the arrangement of FIG. 1 or in the arrangement according to German Pat. No. 195 38 225, which even requires a further stream reversal during filling of an intermediate reservoir. The apparatus according to the present invention does not require the provision of a switch-over valve for realizing an alternate supply of melt to the assemblies, so that no severance of long fibers is encountered.

Although not shown in detail, the injection nozzles 21 may each be provided with a shut-off valve which inhibits a outflow as the injection space 107 is filled with melt and the differential plunger 105 moves backwards.

Figure 3:
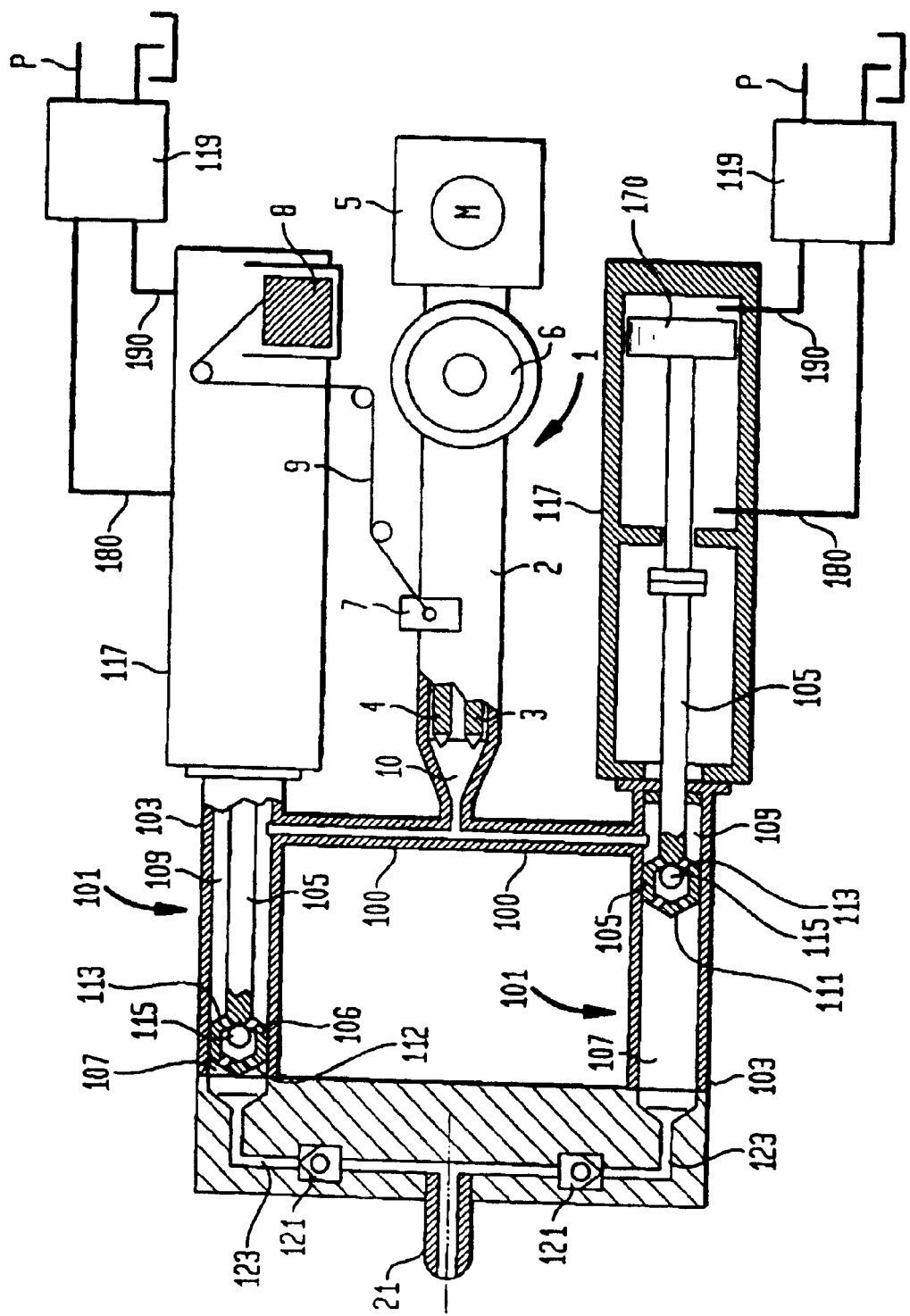
FIG. 3 is a schematic, partially sectional, illustration of another embodiment of an apparatus for making injection-molded parts reinforced with long fibers, in accordance with the present invention.

Turning now to FIG. 3, there is shown a schematic, partially sectional, illustration of another embodiment of an apparatus for making injection-molded parts reinforced with long fibers, in accordance with the present invention. Parts corresponding with those in FIG. 2 are denoted by identical reference numerals and not explained again. In this embodiment, provision is made for the integration of only a single injection mold (not shown in detail), instead of the provision of two injection molds, whereby the mixture of long fibers and melt is introduced into the cavity of the injection mold via the injection nozzle 21. The injection space 107 of each injection assembly 101 is fluidly connected to an injection conduit 123 in which a check valve 121 is disposed. The injection conduit 123 of the one assembly 101 and the injection conduit 123 of the other assembly 101 are interconnected and commonly in fluid communication with the injection nozzle 21. Operation of this apparatus is identical to the apparatus of FIG. 2 so that a further description is omitted for sake of simplicity.

While the invention has been illustrated and described as embodied in a method of and apparatus for producing injection molded parts reinforced with long fibers, it is not intended to be limited to the details shown since various modifications and structural changes may be made without departing in any way from the spirit of the present invention.

What is claimed as new and desired to be protected by Letters Patent is set forth in the appended claims:

What is claimed is:

1. A method of producing thermoplastic injection-molded parts reinforced with long fibers, comprising the steps of:
   continuously feeding a stream of melt of thermoplastic material reinforced with long fibers to a feed space of at least two piston and cylinder units, each having a piston; and
   controlling a pressure upon the piston and cylinder units such that melt is able to flow from the feed space to an injection space in a cylinder of one piston and cylinder unit as a consequence of a differential pressure prevalent on opposite piston surfaces of the piston of the piston and cylinder unit to thereby fill the injection space, whereas melt in the injection space of the other piston and cylinder unit is forced into a cavity of an injection mold while prevented from returning to the feed space and while the feed space receives melt.

2. Apparatus for producing thermoplastic injection-molded parts reinforced with long fibers, comprising:
   a compounder having two meshing screws rotating in a same direction for continuously generating a stream of melt of thermoplastic material reinforced with long fibers;
   at least two piston and cylinder units alternatingly receiving melt from the compounder for injection into at least one cavity of an injection mold at a suitable pressure,
   wherein each said piston and cylinder unit includes a cylinder and a differential piston movably received in the cylinder and dividing the cylinder into a feed chamber and an injection chamber,
   wherein the piston has a greater piston surface, bounding the injection chamber, and a smaller piston surface, bounding the feed chamber,
   wherein the differential piston has a passageway for interconnecting the greater piston surface and the smaller piston surface to permit a flow of melt from the feed chamber into the injection chamber; and
   at least two non-return valves to inhibit a flow of melt from the injection chamber back to the feed chamber, with one non-return valve disposed in the passageway of the differential piston of one piston and cylinder unit, and the other non-return valve disposed in the passageway of the differential piston of the other piston and cylinder unit.

3. The apparatus of claim 2, wherein the melt is produced in the compounder at a pressure which substantially corresponds to a pressure acting on the differential piston during conduction of melt to the injection space to thereby allow even filling of the injection space as the differential piston retracts.

* * * * *